Oct. 2, 1962 — L. E. SMITH ETAL — 3,056,567
WHEEL BRAKING AND SPINNING APPARATUS
Filed May 1, 1959 — 2 Sheets-Sheet 1
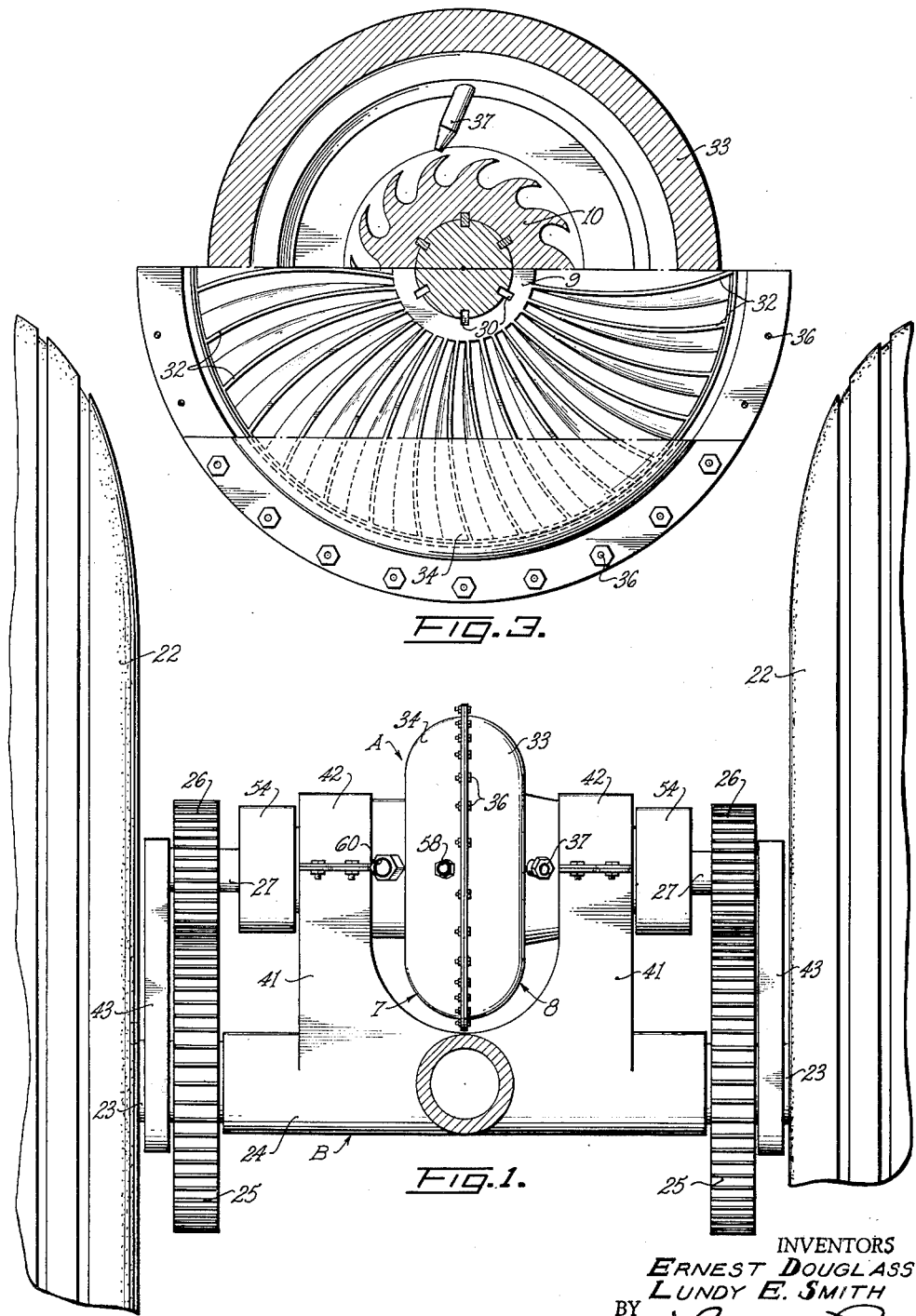
INVENTORS
ERNEST DOUGLASS
LUNDY E. SMITH
BY 
ATTORNEY

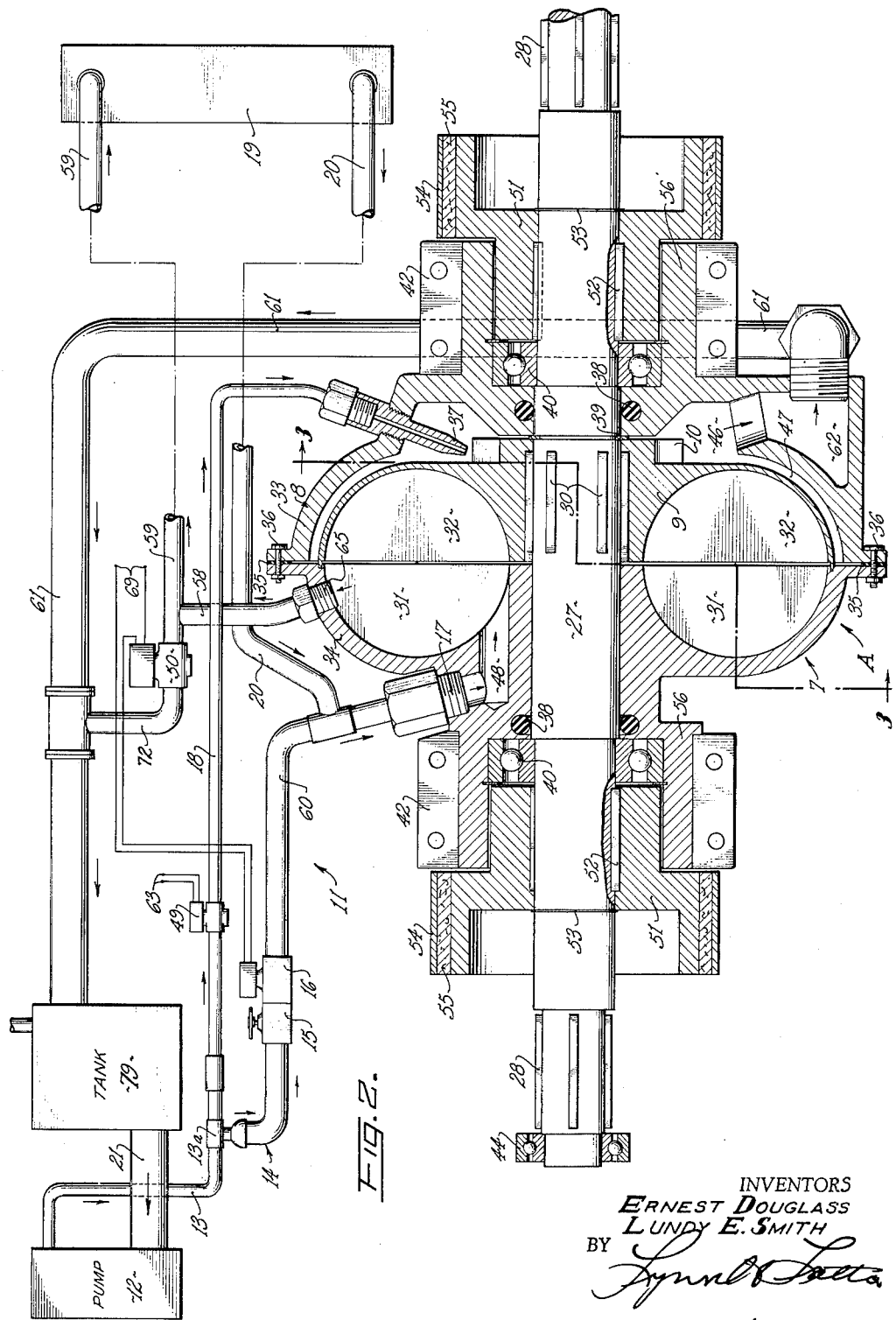

United States Patent Office 3,056,567
Patented Oct. 2, 1962

3,056,567
WHEEL BRAKING AND SPINNING APPARATUS
Lundy E. Smith, 44014 Heaton Ave., Lancaster, Calif., and Ernest Douglass, 426 Caldwell St., Ontario, Calif.
Filed May 1, 1959, Ser. No. 810,405
10 Claims. (Cl. 244—103)

This invention relates to the control of vehicle wheels such as airplane landing gear, and, in particular, to a combined wheel spinning and braking device for vehicle wheels.

It is a primary object of this invention to provide in one unit a means for rotating the wheels on the landing gear of an airplane, a kinetic energy absorption unit for braking the plane or land vehicle from 150 to 0 miles per hour, and a (parking) brake to hold the vehicle in one position after it has come to rest.

In general, the invention contemplates the use of a hydraulic absorption unit, coupled to the wheels of a vehicle, for braking the vehicle smoothly at a maximum deceleration rate without jolting or skidding.

Another object of this invention is the provision of means for rotating the wheels of an airplane prior to touch-down, to impart thereto a peripheral movement approximating the relative movement of the landing surface beneath the plane, so as to minimize the shock and abrasive action of the landing surface against the tires upon contact.

More specifically, the invention contemplates a combined wheel spinning and braking system wherein wheel spinning is effected by a hydraulic turbine mounted on the rotating section of the power absorption unit.

Still another object of this invention is the provision of a means for transmitting energy from the wheels to the absorption unit and for absorption therein at a maximum rate with maximum smoothness, avoiding lock-braking and skidding and thus minimizing tire wear and destruction.

A further object of this invention is the provision of a valving system to control the unit and to hold a predetermined pressure on the hydraulic fluid used therein.

Other objects and advantages will become apparent in the ensuing specification and appended drawings in which:

FIG. 1 is a plan view of apparatus embodying the invention as applied to an airplane landing gear, the strut thereof being shown in horizontal section;

FIG. 2 is a sectional side view of the apparatus with the pump and valve system shown schematically; and FIG. 3 is a vertical sectional view taken on the line 3—3 of FIG. 2.

As shown in FIG. 1 the broad concept of the invention contemplates a combined wheel accelerating and power absorption unit, indicated generally by the letter A, and embodied in a landing gear of an airplane, indicated generally by the letter B.

In the unit A, braking loads are developed in a power absorption unit indicated generally by the numeral 7, and wheel-spinning drive is developed in a turbine, indicated generally by the numeral 8. The absorption unit may be of a type utilized in dynamometers, wherein a bladed rotor 9, driven by the rotating shaft that is transmitting the energy to be absorbed (e.g. the momentum of the moving airplane, converted into rotational driving force in the landing gear axle by the traction of the landing wheels against the landing surface) propels a hydraulic fluid against the blades of a stator that is anchored against rotation.

The driving turbine 8 embodies a turbine wheel 10 fixed to the shaft of the absorption unit for transmitting drive thereto. Overall simplicity of design, compactness, maximum operating efficiency and freedom from trouble are achieved by attaching the blades of the turbine wheel 10 directly to the back of the power absorption rotor; i.e., the power absorption rotor and turbine wheel are embodied in a single rotor with the absorption blades on the front and the turbine blades on the back thereof. This arrangement provides for operation of the power absorption unit by a hydraulic fluid pressure head of much lower intensity (e.g. 300 lbs. per square inch) than that applied to the turbine for driving the same. When the turbine is operative, the absorption unit will be in an evacuated condition, and vice versa.

To create and maintain flows of hydraulic liquid selectively at the relatively high and low pressures for a turbine drive and load absorption unit, respectively, the invention provides a power supply and control unit 11 comprising a pump and system of flow lines and valves for directing the pump output (a) to the turbine inlet at high pressure, with return flow via a larger pipe; (b) to the absorption unit inlet at lower pressure, with return flow through another pipe functioning as an outlet.

The power supply and control unit 11 to operate the mechanism comprises a pump 12 receiving hydraulic fluid from a tank 79 through an inlet line 21 and delivering high pressure (e.g. 800 lbs.) through a discharge line 13 to a T 13a. A wheel-spinning fluid injection line 18 extends from pump discharge line 13 through T 13a to the turbine. Connected to one outlet leg of the T is branch 14 which is equipped with an orifice meter or a pressure reducing valve 15, a modulating (normally closed) valve 16, and braking fluid delivery line 60 to the inlet to the absorber. The terminal portion of delivery line 60 communicates with absorber inlet 48. Return line 20 from liquid cooler 19 also connects to line 60. The fluid enters the stator 31, 34 at low pressure, is picked up by the rotor 9, and then discharged from the stator 31, 34 at higher pressure through absorber outlet line 58. With valve 50 closed the fluid then circulates through line 59 to the cooler 19, and is returned to the stator through lines 20, 60 and fitting 17. Fluid passages 58, 59, 19, 20, and the end of line 60 constitute a braking fluid recirculating line (a closed system). When braking is called for by the pilot, the modulating valve 16 opens to supply fluid to the absorption unit 7 and the normally open valve 50 closes since they are interlocked by being wired in series through control wires 69. When the pilot lowers his landing gear he energises the solenoid on valve 49 through control wires 63 which opens and permits high pressure fluid passing from the other leg of T 13a through line 18, and nozzle 37, to impinge on the blades of turbine wheel 10 causing the rotor to rotate and scavenge all liquid from the absorber. Fluid is then discharged under pressure through line 61 from both the absorber and the turbine chambers back to vented tank 19 and through line 21 to the suction side of the pump.

As shown in FIG. 1, the landing gear wheels 22 are mounted on an axle 23 which rotates within an axle housing 24. Two gears 25 are mounted on the axle, one at each end of housing 24. The gears 25 mesh with another pair of gears 26 which are pressed over splines 28 (FIG. 2) at the ends of a turbine shaft 27 which passes through the unit A and rotates upon ball bearings 40.

Power absorption unit 7 has a fixed stator including blades 31 and a semi-toroidal housing section 34, integral therewith. Rotor 9, with blades 32, is held in position on shaft 27 by a snap ring 39 and secured thereon in driving connection therewith by splines 30. The absorber chamber is defined between rotor 9 and housing section 34. The rotor 9 is contained within a rotor housing 33 which is attached to a marginal flange of housing section 34 by bolts 36, with a gasket 35 interposed between them for fluid sealing. The rotor 9 has the integral driving turbine wheel 10 which is fed by jets 37 in housing 33. Housing sections 33 and 34 cooperate to define a housing for the absorption and turbine unit, such housing being sealed to shaft 27 by a pair of oil seals 38 to prevent fluid leakage from the power absorption unit along shaft 27.

Housing section 33 includes a semi-toroidal section, generally symmetrical to section 34, and spaced from the shell portion to rotor 9, which is correspondingly semi-toroidal on a smaller radius, whereby a turbine discharge passage 47, of saucer shape, is defined between these parts. Casing sections 33 and 34 include respective cylindrical hub portions 56, 56' which are counterbored to receive bearings 40. Within a thickened section of hub 56 adjoining the toroidal portion of housing section 33, is an annular collector labyrinth 46, which conveys the hydraulic fluid to a sump. Jet 37 may be tangentially inserted (FIG. 3), as indicated, into an annular wall of housing section 33, thus providing the sole communication between the high pressure line and labyrinth 46.

The accelerating and power absorption unit A is attached to the axle housing 24 by an integral mounting yoke 41 having a pair of bearings including removable caps 42 to permit the removal of the unit A, and by a pair of spacing mounts 43 positioned outwardly of the gears 25, 26 to maintain uniform spacing between the gears. An outboard bearing 44 (FIG. 2) at each extremity of shaft 27 is mounted in respective mount 43.

*Operation.*—With the control valve 49 in the turbine feed (*a*) position, fluid is delivered under high pressure from pump 12 through line 18 into jets 37 and against the blades of turbine wheel 10 causing it and the wheels 22 to rotate. The fluid then discharges through the turbine discharge passage 46 into sump 62 and returns to tank 14 through line 61.

As the operator moves contacts in his cockpit or driver's compartment, to move valves 16 and 50 to position (*b*) valve 50 closes and fluid passes through pressure reducing valve 15, modulating valve 16, line 60 fitting 17 and passage 48 in hub 56 into the sealed absorber 7 at a lower pressure (e.g. 300 lbs.). The hydraulic fluid enters the power absorption unit 7 through passage 48 and produces a braking or absorbing effect by rotor blades 32 acting as a pump impeller and circulating the fluid against the fixed blades of stator 31. The fluid discharges through fitting 65, lines 58 and 59, cooler 19, and then through line 20 to line 60 returning through passage 48 hence completing the circuit in a closed system. When, for any reason, it is desired to release the brake or reduce its effect the contactor is released which closes valve 16 and opens valve 50 permitting fluid to return through lines 72 and 61 to tank 14. Control wires 69 and 63 are connected to the operating panel in front of the pilot.

A brake drum 51 is attached to shaft 27 between gear 26 and mount 41 at each end, by keys 52 inset into the shaft and held in position by snap rings 53. The drum is encircled by a manually controlled brake shoe 54 having a fibrous lining 55 of a conventional type suitable for holding the vehicle in a parked position.

Valves 15 and 16 function to provide one-way flow from pump 12 into the absorber for filling it with fluid and maintaining it filled at a pressure head of 300 p.s.i., but when the absorber is filled, recirculation of fluid in a braking operation will occur in the closed, path described above, bypassing the valves 15, 16 where line 20 joins line 60.

I claim:

1. In a hydraulic airplane wheel spinning and braking apparatus: a pumping system including a high pressure pump, a supply tank, and pump discharge and inlet lines; a braking power absorption unit including a housing for containing hydraulic fluid, a shaft journalled therein and connected to airplane wheels for transmission of drive therebetween, a rotor fixed on said shaft and having power absorption blades on its forward side, a stator having blades on its rear side fixed in said housing in opposed adjacent relation to said rotor blades for absorbing power therefrom in a braking operation, an absorber chamber being defined between said rotor and stator, an inlet and an outlet in said housing both communicating with said absorber chamber, and a braking fluid recirculating line extending from said outlet to said inlet; a turbine including turbine blades fixed on the rear side of said rotor, jets projecting through said housing and directed toward said turbine blades for driving said turbine in a wheel-spinning operation, and a discharge passage; a return line for returning fluid from said turbine to the supply tank when fluid is being supplied to said jets; said absorber inlet communicating with said pump discharge line; a wheel-spinning fluid injection line also communicating with said pump discharge line and with said turbine jets; and valve means for selectively directing flow of hydraulic fluid from said pump discharge line (*a*) through said injection line for energizing said turbine, and (*b*) to said absorber inlet for effecting a braking cycle of operation of said absorption unit.

2. Apparatus as defined in claim 1, wherein said valve means comprises: a remotely controlled valve in said injection line; and a pressure reducing valve and a remotely controlled modulating valve, both interposed between said pump discharge line and said absorber inlet, for controlling the braking cycle.

3. Apparatus as defined in claim 2, including a fluid cooler interposed in said recirculating line, for removing from braking fluid the heat generated therein by energy absorption.

4. Apparatus as defined in claim 3, including a further normally open valve remotely controlled in unison with said modulating valve for preventing return of fluid to the supply tank during recirculation of fluid in the braking cycle.

5. Apparatus as defined in claim 4, including a pressure-reducing valve providing a connection between said pump discharge line and said modulating valve, said pressure-reducing valve being bypassed by said injection line so that high pressure will be delivered to the latter and reduced pressure will be delivered to said absorber inlet.

6. In a hydraulic airplane wheel spinning and braking apparatus: a pumping system including a high pressure pump and pump discharge and inlet lines; a braking power absorption unit including a housing for containing hydraulic fluid, a shaft journalled therein and connected to airplane wheels for transmission of drive therebetween, a rotor fixed on said shaft and having power absorption blades on its forward side, a stator having blades on its rear side fixed in said housing in opposed adjacent relation to said rotor blades for absorbing power therefrom in a braking operation, an absorber chamber being defined between said rotor and stator, an inlet and an outlet in said housing both communicating with said absorber chamber, and a braking fluid recirculating line extending from said outlet to said inlet; a turbine including turbine blades fixed on the rear side of said rotor, jets projecting through said housing and directed toward said turbine blades for driving said turbine in a wheel-spinning operation, and a turbine discharge passage; a return line for returning fluid from said turbine to the pump when fluid is being supplied to said jets; said absorber inlet communicating with said pump discharge line; a wheel-spinning fluid injection line also communicating with said pump discharge line and with said turbine jets; and valve means selectively operable to (*a*) direct high-pressure flow from said pump discharge line through said injector line for energizing said turbine for wheel-spinning operation; and (*b*) provide a reduced-pressure flow from said pump discharge line to said absorber inlet while cutting off flow through said injection line, for effecting a braking cycle of absorption of energy in said absorption unit.

7. Apparatus as defined in claim 6, wherein said last means includes a pressure reducing valve in the connection between said pump discharge line and the absorber inlet, resisting flow thereto when flow is directed into said injection line and providing flow to said absorber inlet when flow to said injection line is cut off, and further including a remotely controlled cut-off valve for thus cutting off flow to said injection line.

8. Apparatus as defined in claim 7, wherein said return line is unobstructed at all times, and further including a return connection from said absorber outlet to said return line, and a remotely controlled valve in said connection, for releasing fluid from the absorption unit when opened, said last mentioned valve being closed during the braking cycle, to enforce recirculation in said recirculation line.

9. Apparatus as defined in claim 8, including electrical control means for actuating said last mentioned valve in unison with said cut-off valve so as to release the absorption unit discharge to said return line for inactivating the absorption unit while directing flow through said injection line for energizing the turbine unit.

10. Apparatus as defined in claim 9, including a fluid cooler interposed in said recirculating line, for removing from braking fluid the heat generated therein by energy absorption.

References Cited in the file of this patent
UNITED STATES PATENTS

| | | |
|---|---|---|
| 2,365,126 | Vickers et al. | Dec. 12, 1944 |
| 2,428,005 | Bennett | Sept. 30, 1947 |
| 2,468,828 | Kopp | May 3, 1949 |
| 2,651,916 | Batten | Sept. 15, 1953 |
| 2,665,087 | Clover | Jan. 5, 1954 |
| 2,827,133 | Schneider | Mar. 18, 1958 |